United States Patent
Wu et al.

(10) Patent No.: US 8,194,208 B2
(45) Date of Patent: Jun. 5, 2012

(54) BACKLIGHT MODULE WITH A HEAT CONDUCTIVE BLOCK

(75) Inventors: Meng-chai Wu, Jhubei (TW); Chi-chung Lo, Yongjing Township, Changhua County (TW); Chin-kun Hsieh, Hsinchu (TW); Cheng-chih Lai, Changhua (TW); Chi-chen Cheng, Ershuei Township, Changhua County (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 12/881,145

(22) Filed: Sep. 13, 2010

(65) Prior Publication Data
US 2011/0007521 A1   Jan. 13, 2011

Related U.S. Application Data

(63) Continuation of application No. 11/433,093, filed on May 12, 2006, now abandoned.

(30) Foreign Application Priority Data

Dec. 23, 2005 (TW) ................................ 94146287 A

(51) Int. Cl.
*G02F 1/1333* (2006.01)
*G02F 1/1335* (2006.01)
*F21V 7/04* (2006.01)

(52) U.S. Cl. ............ 349/65; 349/58; 349/161; 362/612; 362/631; 362/632

(58) Field of Classification Search ................ 349/58, 349/60–62, 65, 161; 362/612, 631, 632
See application file for complete search history.

(56) References Cited

U.S. PATENT DOCUMENTS

| | | | |
|---|---|---|---|
| 5,453,855 A | 9/1995 | Nakamura et al. | |
| 6,441,943 B1 | 8/2002 | Roberts et al. | |
| 6,697,130 B2 | 2/2004 | Weindorf et al. | |
| 6,741,301 B2 | 5/2004 | Tsuji | |
| 6,808,302 B2 | 10/2004 | Miyamoto | |
| 6,880,947 B2 | 4/2005 | Hsieh et al. | |
| 7,344,279 B2 | 3/2008 | Mueller et al. | |
| 2004/0136189 A1 | 7/2004 | Vanderschuit | |
| 2005/0180142 A1 | 8/2005 | Tsai | |
| 2005/0243576 A1 | 11/2005 | Park et al. | |
| 2007/0008457 A1 | 1/2007 | Takahashi et al. | |

FOREIGN PATENT DOCUMENTS

| | | |
|---|---|---|
| CN | 1501130 | 6/2004 |
| CN | 1649182 | 8/2005 |
| CN | 1700069 | 11/2005 |
| TW | I226713 | 1/2005 |
| TW | I229725 | 3/2005 |

*Primary Examiner* — Mark Robinson
*Assistant Examiner* — Paisley L Arendt

(57) ABSTRACT

A backlight module includes a bezel having at least one edge, a circuit board, one or more light emitting diodes connected to the circuit board for emitting light. Each light emitting diode has a light axis which is neither parallel nor vertical to the edge of the bezel. The backlight module utilizes a heat conductive block disposed between the bezel and the light emitting diode for transferring heat generated by the light emitting diode to the bezel.

15 Claims, 3 Drawing Sheets

BACKLIGHT MODULE WITH A HEAT CONDUCTIVE BLOCK

CROSS REFERENCE TO RELATED APPLICATION

This is a Continuation Application of U.S. application Ser. No. 11/433,093, filed on May 12, 2006, now abandoned which is incorporated herein by reference in its entirety.

BACKGROUND OF THE INVENTION

1. Field of the Invention

The present invention relates to a backlight module, and more particularly, to a backlight module capable of arising heat dissipation.

2. Description of the Related Art

A backlight module is a key component of a liquid crystal display (LCD). The purpose of the backlight module is to provide a sufficient-brightness and an even-distribution of light on surface to the LCD panel. Because the LCD is widely used in various electronic products such as monitors for notebook computers, digital cameras, and projectors, the demand for the backlight module has increased tremendously.

In addition to cold cathode fluorescent lamps (CCFLs), light emitting diodes are increasingly used in medium and large size liquid crystal displays. Please refer to FIG. 1, which shows a prior art backlight module 10 having a plurality of light emitting diodes disposed on a bezel. Conventionally, the plurality of LEDs 12 are disposed at the sides of bezel 16 and emit light beams upon receiving driving signals from a driver (not shown) via a pin 18. An arrow A indicates a direction of light axis of the LED 12. A greater power LED emits higher brightness and generates more heat as well. In order to promptly dissipate generated heat, a traditional way is to position the LED 12 on a metal core printed circuit board (MCPCB) 14. The generated heat is rapidly transferred to bezel 16 and is therefore dissipated by means of air convection. In addition, for more efficient heat dissipation, both the metal core printed circuit board (MCPCB) 14 and bezel 16 are made of metal with high thermal conductivity.

With a rapid development of LED manufacturing, maximum luminance provided for new LEDs is greater. Certainly, using new LEDs can reduce the number of LEDs used in a backlight module, thereby reducing the cost. Nevertheless, luminance of the LED is inverse proportion to its operating temperature and thus shortens the life span of the LED, and how to improve the heat dissipation in order to lower operating temperature of the LED is a main goal for backlight module manufacturers.

SUMMARY OF INVENTION

It is therefore an objective of the claimed invention to provide a backlight module utilizing a heat conductive block positioned between a bezel and an LED to increase LED's contact area against the bezel, conducive to heat dissipation.

Briefly summarized, a backlight module includes a bezel having at least one edge, a circuit board, one or more light emitting diodes connected to the circuit board for emitting light. Each light emitting diode has a light axis which is neither parallel nor vertical to the edge of the bezel. The backlight module utilizes a heat conductive block disposed between the bezel and the light emitting diode for transferring heat generated by the light emitting diode to the bezel.

An advantage of the present invention is to provide a heat conductive block positioned between the LED and the bezel, which serves as a heat-transferring bridge between the LED and the bezel. For the LED at the corner of the bezel, since the heat conductive block contacts the edge and the bottom surfaces of the bezel, heat generated by the LED is able to be dissipated quickly through the heat conductive block.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 2:
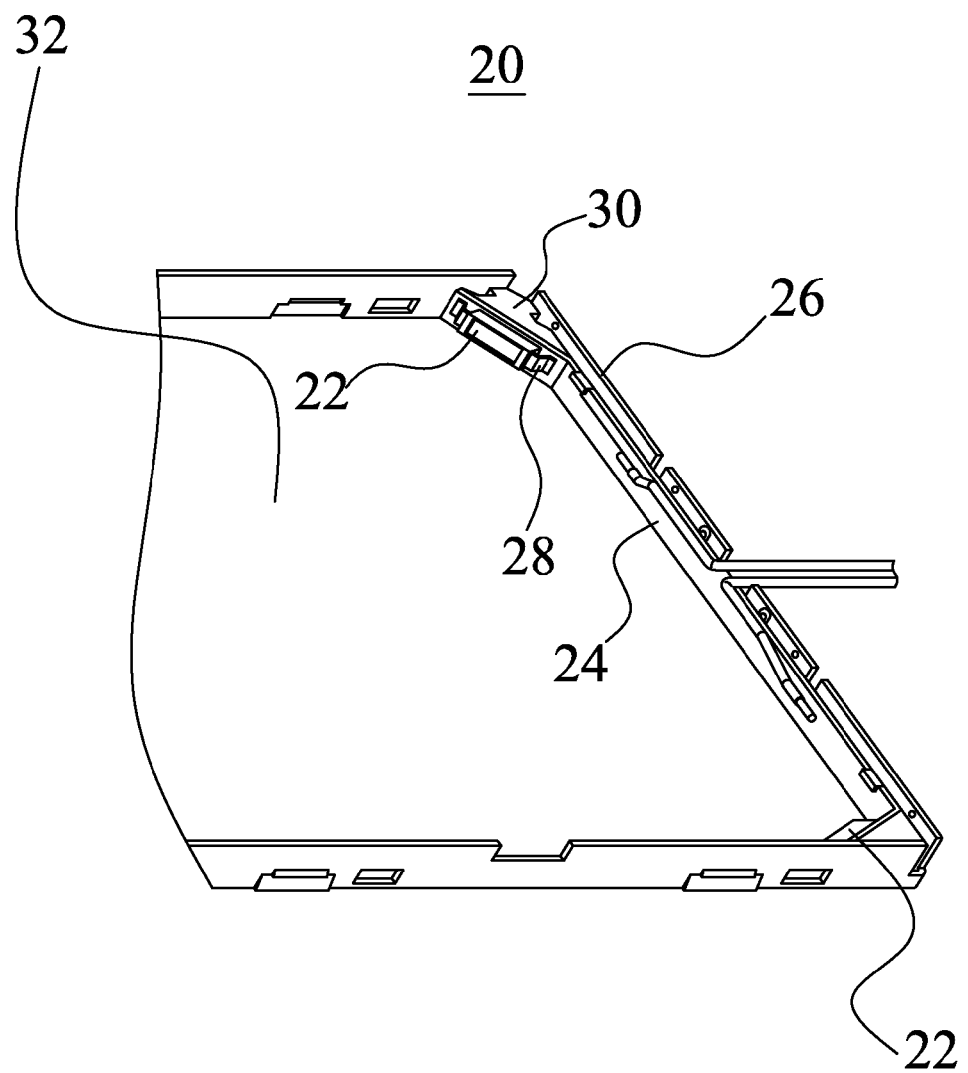
FIG. 2 shows a diagram of a backlight module according to the present invention.
Figure 3:
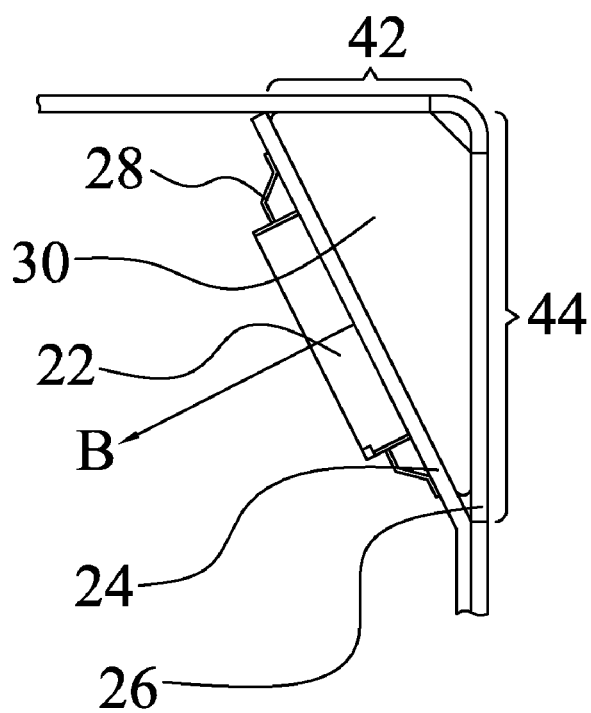
FIG. 3 is a partially enlarged diagram of the backlight module depicted in FIG. 2.

Please refer to FIGS. 2 and 3. FIG. 2 shows a diagram of a backlight module 20 according to the present invention, and FIG. 3 is a partially enlarged diagram of the backlight module 20 depicted in FIG. 2. The backlight module 20 comprises a bezel 26 and a plurality of light emitting diodes (LEDs) 22 disposed at the corners of the bezel 26. A bottom surface 32 of the bezel 26 is used for positioning such optical components as a light guide plate, a diffusion sheet, and a brightness enhancement film, for simplicity, not shown in FIG. 2. Also, the plurality of light emitting diodes (LEDs) 22 is disposed on a circuit board 24. A heat conductive block 30 is positioned between the circuit board 24 and the bezel 26. Both the heat conductive block 30 and the bezel 26 are made of metal (e.g. aluminum) or other materials having high thermal conductivity.

Figure 1:
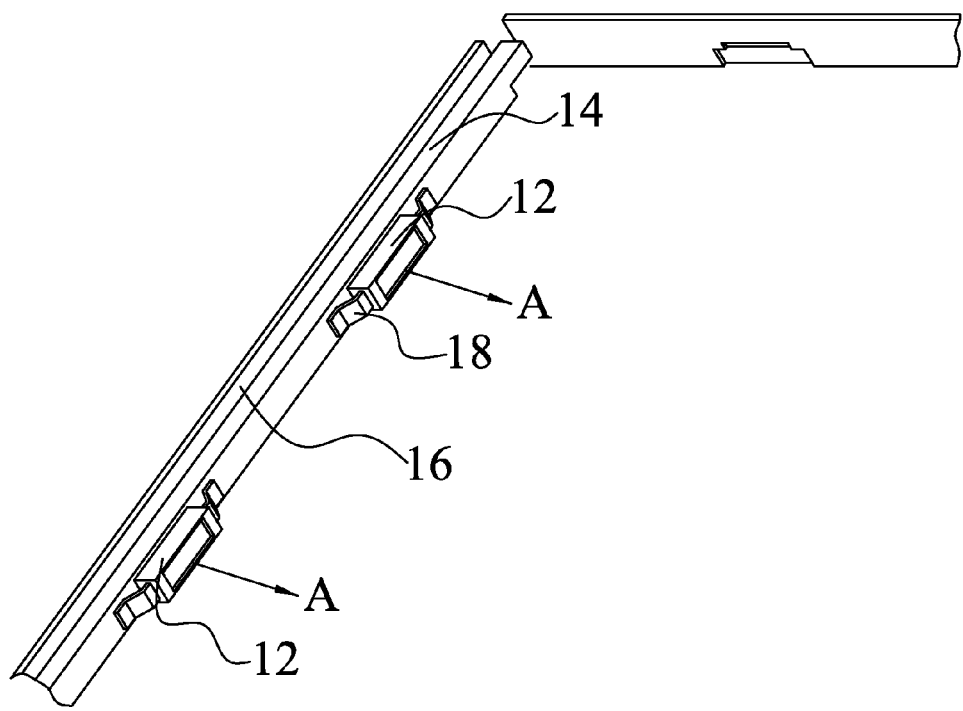
FIG. 1 shows a prior art backlight module having a plurality of light emitting diodes disposed on a bezel.

When the LED 22 emitting light triggered by a driver (not shown) via a pin 28, heat is generated. The emitted light is guided by a patterned surface of a light guide plate (not shown) to a liquid crystal panel, while the generated heat is transferred to bezel 26 via a circuit board 24 and a heat conductive block 30. In addition, the bezel 26 contacting the heat conductive block 30 in areas 42 and 44, as well as a contact area between the bottom of surface 32 of bezel 26 and the heat conductive block 30. Compared with the prior art backlight module of FIG. 1, heat generated from the LED 22 is more quickly dissipated by air convection through larger contact areas between the bezel 26 and the heat conductive block 30.

Preferably, the circuit board 24 is a flexible print circuit board (PCB) capable of being laid on the bezel 26.

LED 22 is positioned at the corner of the bezel 26, and is neither vertical nor parallel to the edges of the bezel 26. In other words, the light axis B of the LED 22 is neither vertical nor parallel to the edges of the bezel 26 where the light axis indicates a median of the maximum luminance region of the LED. In doing so, a fewer number of the LED 22 positioned at the corner of the bezel 26 is sufficient for providing the required brightness for the visible active area of a liquid crystal display.

Preferably, the solid heat conductive block 30 is made of a metal with high thermal conductivity, and is not shaped as rectangular. For better heat dissipating efficiency, the heat conductive block 30 is affixed and attached to the bezel 26 to minimize the gap between the heat conductive block 30 and bezel 26. Furthermore, the heat conductive block 30, the circuit board 24, and the bezel 26, are adhered with a high polymer having high thermal conductivity eliminating air gap therebetween.

The present invention backlight module is for use in liquid crystal displays that use the LED as a light source.

To sum up, the LED of the present invention backlight module is arranged at the edge of the bezel, and the alignment of the LED is neither vertical nor parallel to the edge of the bezel. In addition, the present backlight module invention uses a heat conductive block positioned between the LED and the bezel to increase the contact areas between the bezel and the heat conductive block, thereby causing better heat dissipating efficiency. As to the LED disposed at the corner of the bezel, heat-dissipating efficiency is improved because of the heat conductive block directly contacting the edge surfaces and bottom surface of the bezel.

Although the present invention has been explained by the embodiments shown in the drawings described above, it should be understood to the ordinary skilled person in the art that the invention is not limited to the embodiments. For example, the number of LEDs used depends on the design demand, and two or more LEDs which are not parallel or vertical to either edges of the bezel are also allowed.

Although the present invention has been explained by the embodiments shown in the drawings described above, it should be understood to the ordinary skilled person in the art that the invention is not limited to the embodiments, but rather the various changes or modifications thereof are possible without departing from the spirit of the invention. For example, in addition to the metal used in the aforementioned invention, the bezel and the circuit board are also made of any material with high thermal conductivity.

The present invention has been described with reference to certain preferred and alternative embodiments which are intended to be exemplary only and not limited to the full scope of the present invention as set forth in the appended claims. Accordingly, the scope of the invention shall be determined only by the appended claims and their equivalents.

What is claimed is:

1. A backlight module for use in an LCD, comprising:
   a metal bezel having a bottom surface, a first edge surface perpendicular to the bottom surface, a second edge surface perpendicular to the bottom surface and the first edge surface, and a corner jointing the bottom surface, the first edge surface and the second edge surface;
   a heat conductive block disposed at the corner;
   a flexible circuit board disposed on the second edge surface of the metal bezel and the heat conductive block, wherein the flexible circuit board comprises a first surface and a second surface opposite to the first surface, and the second surface faces to the first edge surface and the second edge surface and contacts with the heat conductive block; and
   a light emitting diode disposed on the flexible circuit board and corresponding to the heat conductive block, and contacting with the first surface of the flexible circuit board.

2. The backlight module of claim 1, wherein the light emitting diode comprises a light axis neither parallel nor perpendicular to the first edge surface and the second edge surface of the metal bezel.

3. The backlight module of claim 1, wherein the heat conductive block, the flexible circuit board, and the metal bezel are adhered with a high polymer having high thermal conductivity.

4. The backlight module of claim 1, wherein the heat conductive block is attached to the metal bezel.

5. The backlight module of claim 1, wherein the heat conductive block directly contacts the bottom surface, the first edge surface, or the second edge surface.

6. A backlight module for use in an LCD, comprising:
   a metal bezel having a first edge surface, a second edge surface perpendicular to the first edge surface, and a bottom surface connecting the first edge surface and the second edge surface;
   a heat conductive block connecting a first area of the first edge surface;
   a flexible circuit board having a first portion connecting the heat conductive block and a second portion laid on a second area of the second edge surface, wherein the flexible circuit board comprises a first surface and a second surface opposite to the first surface, and the second surface faces to the first edge surface and the second edge surface and contacts with the heat conductive block; and
   a light emitting diode disposed on the first portion of the flexible circuit board and contacting with the first surface of the flexible circuit board, wherein the first portion of the flexible circuit board is connected between the heat conductive block and the light emitting diode, and the light emitting diode comprises a light axis neither parallel nor perpendicular to the first edge and the second edge of the bezel.

7. The backlight module according to claim 6, wherein the heat conductive block connects the second area of the second edge surface.

8. The backlight module according to claim 6, wherein the heat conductive block connects a contact area of the bottom surface.

9. The backlight module according to claim 6, wherein the second portion is parallel to the second area.

10. A backlight module for use in an LCD, comprising:
    a metal bezel having a first edge surface, a second edge surface perpendicular to the first edge surface, and a bottom surface connecting the first edge surface and the second edge surface;
    a heat conductive block connecting a contact area of the bottom surface;
    a flexible circuit board having a first portion connecting the heat conductive block and a second portion laid on a second area of the second edge surface, wherein the flexible circuit board comprises a first surface and a second surface opposite to the first surface, and the second surface faces to the first edge surface and the second edge surface and contacts with the heat conductive block; and
    a light emitting diode disposed on the first portion of the flexible circuit board and contacting with the first surface of the flexible circuit board, wherein the first portion of the flexible circuit board is connected between the heat conductive block and the light emitting diode, and the light emitting diode comprises a light axis neither parallel nor perpendicular to the first edge and the second edge of the bezel.

11. The backlight module according to claim 10, wherein the heat conductive block connects a first area of the first edge surface neither parallel nor vertical to the first portion.

12. A backlight module for use in an LCD, comprising:
    a metal bezel having a first edge surface, a second edge surface perpendicular to the first edge surface, and a bottom surface connecting the first edge surface and the second edge surface;

a heat conductive block connecting a second area of the second edge surface;

a flexible circuit board having a first portion connecting the heat conductive block and a second portion laid on the second area of the second edge surface, wherein the flexible circuit board comprises a first surface and a second surface opposite to the first surface, and the second surface faces to the first edge surface and the second edge surface; and a light emitting diode disposed on the first portion of the flexible circuit board and the light emitting diode contacting with the first surface, wherein the first portion of the flexible circuit board is connected between the heat conductive block and the light emitting diode, and the light emitting diode comprises a light axis neither parallel nor perpendicular to the first edge and the second edge of the bezel.

13. A backlight module for use in an LCD, comprising:

a metal bezel having a bottom surface, a first edge surface perpendicular to the bottom surface, and a second edge surface perpendicular to the bottom surface and the first edge surface;

a flexible circuit board disposed on the metal bezel, wherein the flexible circuit board comprises a first surface and a second surface opposite to the first surface, and the second surface faces to the first edge surface and the second edge surface;

a light emitting diode contacting with the first surface and disposed on the flexible circuit board for generating light; and a heat conductive block contacting with the second surface, for transferring heat generated by the light emitting diode, wherein a space surrounded by the first edge surface, the second edge surface, and the flexible circuit board fits the heat conductive block.

14. The backlight module of claim 13, wherein the heat conductive block contacts to the first edge surface, the second edge surface, and the flexible circuit board.

15. The backlight module of claim 13, wherein the flexible circuit board is perpendicular to the bottom surface.

* * * * *